3,149,117
4 - HALOALKYL - 2,2 - DIALKYL - 1,2 - DIHYDRO-
QUINOLINES AND PROCESS FOR THE PREPA-
RATION THEREOF
Joseph Patrick Brown, Geufron, Llangollen, Wales, assignor to Monsanto Chemicals Limited, London, England, a British company
No Drawing. Filed Apr. 18, 1962, Ser. No. 188,518
Claims priority, application Great Britain May 8, 1961
10 Claims. (Cl. 260—283)

This invention relates to dihydroquinolines, and in particular to new halogen-containing dihydroquinolines, a process for their production, and to their use as mycobacteriostats.

It has now been found that substitution halogenation occurs on treatment with a halogenating agent of a dihydroquinoline having an aliphatic substituent, that is to say substitution halogenation of the aliphatic substituent or substitution halogenation of the benzene ring of the dihydroquinoline; moreover, both types of substitution halogenation can take place.

This novel reaction can be applied to the production of halogen-containing dihydroquinolines and their salts, which are useful as mycobacteriostats, that is to say substances able to inhibit the growth of bacteria and fungi. The compounds are also useful as antioxidants.

The process of the invention is one in which a dihydroquinoline having an aliphatic substituent is reacted with a halogenating agent.

The resulting halogen-containing dihydroquinolines and their salts can be used in mycobacteriostatic compositions, and the invention includes a mycobacteristatic composition that comprises an inert diluent and one or more of these dihydroquinolines or their salts.

The novel halogen-containing dihydroquinolines of this invention can be generally defined as 4-haloaliphatic-2,2-dialkyl-1,2-dihydroquinolines and certain salts thereof. Such compounds are illustrated by the formula (I)

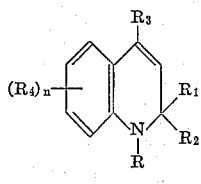

wherein:

R is selected from the group consisting of hydrogen, lower alkyl, lower alkyl carbonyl, benzenesulfonyl and toluenesulfonyl;
$R_1$ and $R_2$ are each lower alkyl;
$R_3$ is lower haloalkyl;
$n$ is an integer from 0 to 4; and
$R_4$ is selected from the group consisting of halogen and alkyl and alkoxy of 1 to 12 carbon atoms.

The salts of such dihydroquinolines contemplated by this invention are the sulfate, oxalate and halide salts.

As employed herein, the term "lower alkyl" connotes those alkyl radicals which contain from 1 to 5 carbon atoms; e.g. methyl, ethyl, isopropyl, t-butyl and n-amyl. The halogens contemplated by this invention are chlorine, bromine, iodine and fluorine, although it should be noted that chlorine and bromine are preferred.

By the process of the invention there can be produced halogenated dihydroquinolines that contain one or more halogen atoms, and as has been explained above, a halogen atom can occur for instance as a substituent in the benzene ring as well as in the aliphatic substituent.

The halogen that is introduced by the process of the invention is preferably chlorine or bromine, although it can be fluorine or iodine. Often the halogens themselves are the most convenient halogenating agents; good results are however also obtained with other halogenating agents such as for instance the sulfuryl halides, for example sulfuryl chloride, and compounds having a halogen atom linked to a nitrogen atom, for example N-bromosuccinimide.

The dihydroquinoline that is halogenated in the process of the invention is, in general, one wherein the two additional hydrogen atoms that distinguish it from the corresponding quinoline are linked to atoms of the ring that contains the nitrogen atom; it can thus be, for example, a 1,2-dihydroquinoline or a 1,4-dihydroquinoline. Moreover, the dihydroisoquinoline isomers can also be employed. The dihydroquinoline can, in general, be employed as the free base or in the form of a derivative in which the nitrogen atom is protected, as in an N-acylated derivative.

The aliphatic substituent in the dihydroquinoline is, in general, linked to a carbon atom of the ring that contains the nitrogen atom in the dihydroquinoline nucleus, said carbon atom being itself linked to an adjacent member of the ring by a double bond. Thus the dihydroquinoline that is halogenated can be a 1,2-dihydroquinoline having the aliphatic substituent in the 3- or in the 4-position, or a 1,4-dihydroquinoline having the aliphatic substituent in the 2- or in the 3-position. A preferred class are 1,2-dihydroquinolines having the aliphatic substituent in the 4-position as shown in the formula above.

The aliphatic substituent itself can be, for example, a simple alkyl group, such as a methyl, ethyl or butyl group, or one of these groups having an inert substituent such as, for instance, a halogen atom, for example a chlorine or bromine atom; an alkoxy group, for example a methoxy or ethoxy group; or an aryl group, such as a phenyl group. Generally the aliphatic group is such that the α-carbon atom by which it is linked to the dihydroquinoline nucleus carries at least one hydrogen atom. In many instances the aliphatic substituent is preferably a methyl, ethyl, chloromethyl, bromomethyl, chloroethyl or bromoethyl group.

In the halogenation of a member of the preferred class of 1,2-dihydroquinolines having the aliphatic substituent in the 4-position and where the aliphatic substituent is a hydrocarbon substituent, the first halogen atom introduced by the process of the invention normally replaces a hydrogen atom carried by the α-carbon atom of the aliphatic hydrocarbon substituent, and in the halogenation of, for example, a 4-methyl-1,2-dihydroquinoline, the initial product is a 4-halogenomethyl-1,2-dihydroquinoline. Where the process is used for the introduction of more than one halogen atom, and the 1,2-dihydroquinoline starting-material contains the appropriate replaceable hydrogen atoms, the second and third halogen atoms normally enter the 1,2-dihydroquinoline nucleus, so that di- and tri-halogenation give a halogen-containing dihydroquinoline having one halogen atom in the 4-substituent and one in the dihydroquinoline nucleus, and a halogen-containing dihydroquinoline having one halogen atom in the 4-substituent and two halogen atoms in the dihydroquinoline nucleus respectively. Further halogenation can, in appropriate instances, result in the replacement of a further hydrogen atom of the aliphatic substituent or of the dihydroquinoline nucleus; in the addition of halogen to the double bonds of the dihydroquinoline nucleus; and in N-halogenation; compounds containing for example four, five, six or eight halogen atoms can be obtained.

Where the process of the invention is applied to dihydroquinolines containing different aliphatic substituents, the order in which hydrogens atoms are replaced by halogen atoms may be different, but nono- or polyhalogenated products can be obtained.

The quantity of halogenating agent employed in the process relative to the amount of dihydroquinoline starting-material depends on the number of halogen atoms to be introduced into the dihydroquinoline molecule. Usually stoichiometric or near-stoichiometric proportions of the reactants are employed.

Preferably, the new halogen-containing dihpdroquinolines are prepared by reacting the dihydroquinoline starting-material with the appropriate halogenating agent in the presence of a solvent, in general an organic solvent, for example a paraffin hydrocarbon, or preferably a haloalkane, such as chloroform or dibromoethane. The reaction temperature is preferably fairly low; for instance good results are obtained when the temperature does not exceed 40° C. The process can generally be operated under normal atmospheric conditions, that is at a temperature within a range of say 10° to 30° C., for example about 15° or 20° C.

Where the halogenating agent is such that the corresponding hydrogen halide is formed in the halogenation reaction, the initial product is often the hydrohalide of the halogen-containing dihydroquinoline. The is so, for example, where a halogen or a sulfuryl halide is used for the introduction of not more than three or four halogen atoms into a free dihydroquinoline base or into an N-acylated dihydroquinoline, the acyl group being one derived from a lower carboxylic acid (for instance an acetyl group). Such an acyl group is normally at least partially removed during the halogenation, and its removal can, if desired, be completed by the addition of, for example, an alcohol or an aqueous alcohol to the reaction mixture at the end of the halogenation. Substantially complete removal of such an acyl group during the process occurs where the haloalkane preferably employed as a solvent contains a minor proportion of an alcohol, for example ethanol. It is often preferable to use such an N-acylated starting-material rather than the corresponding free base, because the product is purer and is obtained in better yield. Hydrohalide formation tends to occur less readily as the degree of halogenation increases, so that in instances where say four or five halogen atoms have been introduced (using as starting-material either a free dihydroquinoline base or an N-acylated dihydroquinoline of the type specified above), the product is normally the halogen-containing free base.

Where the acyl group in an N-acylated dihydroquinoline starting-material is less labile, for example a benzenesulfonyl group, the corresponding N-acylated halogen-containing dihydroquinoline is itself the primary product of the reaction. An N-acyl group remains intact irrespective of type where the halogenation reaction does not involve the formation of a free hydrogen halide, for example where the halogenating agent is one containing a halogen atom linked to a nitrogen atom.

Where a hydrohalide salt is the initial product of the process, the corresponding free base can, if desired, be obtained from it by treatment with a base such as, for instance, sodium hydroxide. Certain of the halogen-containing dihydroquinoline bases, for example those derived from 1,2-dihydroquinolines having a aliphatic substituent in the 4-position and containing one or two halogen atoms, tend to be unstable however. Often no attempt need be made to isolate such bases since the hydrohalide salts are themselves very effective mycobacteriostats.

The salts of the new halogen-containing dihydroquinolines are the acid addition salts generally, including for example the sulfates and oxalates as well as the hydrohalides such as the hydrochlorides and hydrobromides, and the quaternary ammonium salts, such as the quaternary halides. Where the base is stable, salts can be obtained by treating said base with the appropriate reagent, that is to say with an acid where the salt is an acid-addition salt, or for example with an alkyl halide, such as ethyl bromide, where the salt is a quaternary ammonium salt. Where the base is unstable, other acid addition salts can be obtained from the hydrohalides by other methods, such as for instance the action of a soluble salt of a metal that forms an insoluble halide.

The invention is illustrated by the following examples.

*Example I*

This example describes the preparation of 4-bromomethyl-2,2-dimethyl-1,2-dihydroquinoline hydrobromide, (a) from N - acetyl - 2,2,4 - trimethyl - 1,2-dihydroquinoline and (b) from 2,2,4-trimethyl-1,2-dihydroquinoline.

The chloroform used in this and following examples contained 1% by volume of ethanol.

(a) A solution of 8.4 grams of bromine in 100 cc. of chloroform was added with stirring to 10.3 grams of N-acetyl-2,2,4-trimethyl-1,2-dihydroquinoline in 50 cc. of chloroform, during 1½ hours and at room temperature (20° C.). The reaction mixture was allowed to stand for a further 24 hours, and the chloroform was then evaporated under reduced pressure. The residue obtained was a mixture of crystals and oily material which were subsequently separated by filtration. On standing, the oily material deposited further crystals; these were combined with the first crop to give a total yield of 10 grams of material having a melting point (with decomposition) of about 180° C. After recrystallization from ethanol, the product had a melting point (with decomposition) of 189–191° C. Its elementary analysis and chemical properties indicated that it was 4-bromomethyl-2,2-dimethyl-1,2-dihydroquinoline hydrobromide. The 10 grams of crude material represented a yield of 62.5%.

(b) A solution of 33.6 grams of bromine in 400 cc. of chloroform was added with stirring to 34.6 grams of 2,2,4-trimethyl-1,2-dihydroquinoline in 180 cc. of chloroform, during 5 hours and at room temperature. The chloroform was then evaporated under reduced pressure at a temperature not exceeding 35° C., giving a resinous residue. Acetone was added to this, and crystalline material was deposited slowly. After standing at room temperature for several days, 25 grams of crystals having a melting point of about 180° C. (with decomposition) were isolated, representing a yield of 38%. The infra-red spectrum of this material was substantially identical with that of the compound obtained from N-acetyl-2,2,4-trimethyl-1,2-dihydroquinoline, but showed the pressure of traces of impurities not present in the product of preparation (a). The identity of the product of preparation (b) with that of preparation (a) was confirmed by the melting point and elementary analysis of a purified sample.

*Example II*

This example describes the preparation of N-benzenesulfonyl-4-bromomethyl-2,2-dimethyl-1,2 - dihydroquinoline.

16.8 grams of bromine dissolved in 200 cc. of chloroform were added with stirring to a solution of 31.3 grams of N-benzenesulfonyl-2,2,4-trimethyl-1,2-dihydroquinoline in 150 cc. of chloroform, during 2 hours and at room temperature. The chloroform was then evaporated under reduced pressure at a temperature of 30°–40° C., giving an oily residue containing particles of solid; on diluting this with 100 cc. of ethanol a further quantity of solid was deposited. 4.8 grams were isolated by filtration, and after crystallization from ethanol, N-benzenesulfonyl-4-bromomethyl-2,2-dimethyl-1,2-dihydroquinoline was obtained as white crystals having a melting point of 115°–117° C.

*Example III*

This example describes the preparation of N-acetyl-4-bromomethyl-2,2-dimethyl-1,2-dihydroquinoline by the reaction of N-acetyl-2,2,4-trimethyl-1,2-dihydroquinoline with N-bromosuccinimide.

A mixture of 4.3 grams (0.02 mol.) of N-acetyl-2,2,4-trimethyl-1,2-dihydroquinoline, 3.6 grams (0.02 mol.) of N-bromosuccinimide and 0.25 gram of benzoyl peroxide in 70 cc. of carbon tetrachloride was boiled for 1 hour. Succinimide was precipitated during this time and, after cooling, was filtered off. Evaporation of the solvent from the filtrate under reduced pressure gave 3.75 grams of an off-white solid. This was recrystallized from ethanol to give N-acetyl-4-bromomethyl-2,2-dimethyl-1,2 - dihydroquinoline having a melting point of 107–109° C., and the composition C, 56.8; H, 5.5; N, 5.0; Br, 27.1%. ($C_{14}H_{16}BrNO$ requires C, 57.2; H, 5.4; N, 4.8; Br, 27.2%.)

*Example IV*

This example describes the preparation of 4-chloromethyl-2,2-dimethyl-1,2-dihydroquinoline hydrochloride from N-acetyl-2,2,4-trimethyl-1,2-dihydroquinoline and (*a*) chlorine, (*b*) sulfuryl chloride.

(*a*) Chlorine was passed into a stirred solution of 43 grams (0.2 mol.) of N-acetyl-2,2,4-trimethyl-1,2-dihydroquinoline in 200 cc. of carbon tetrachloride at 10–20° C. until an increase in weight of 14.2 grams (0.2 mol. of chlorine) was recorded. 2 cc. of ethanol were then added, and on standing during 24 hours, 5.4 grams of a solid separated from the solution. This was filtered off and recrystallized from ethanol to give 4-chloromethyl-2,2-dimethyl-1,2-dihydroquinoline hydrochloride having a melting point (with decomposition) of about 180° C., and the composition C, 59.0; H, 6.4; Cl, 28.7; N, 6.0. ($C_{12}H_{15}Cl_2N$ requires C, 59.0; H, 6.1; Cl, 29.1; N, 5.7%.)

(*b*) A solution of 4 cc. (0.05 mol.) of sulfuryl chloride in 20 cc. of carbon tetrachloride was added to a stirred solution of 10.7 grams (0.05 mol.) N-acetyl-2,2,4-trimethyl-1,2-dihydroquinoline in 80 cc. of carbon tetrachloride during half an hour at 15–25° C. The solution was allowed to stand for 2 hours at room temperature, and 2 cc. of ethanol were then added. During the following 24 hours, 8.6 grams of a solid separated from the solution. This solid was shown by its melting point and infra-red spectrum to be identical with the product of preparation (*a*).

*Example V*

This example describes the preparation of 4-bromomethyl-2,2-dimethyl-6-ethoxy-1,2-dihydroquinoline hydrobromide by the bromination of N-acetyl-2,2,4-trimethyl-6-ethoxy-1,2-dihydroquinoline.

A solution of 5.4 cc. (0.095 mol.) of bromine in 200 cc. of chloroform was added to a stirred solutioon of 25 grams (0.095 mol.) of N-acetyl-2,2,4-trimethyl-6-ethoxy-1,2-dihydroquinoline during 5 hours at about 20° C. Next day, the bulk of the chloroform was evaporated under reduced pressure at a temperature not exceeding 40° C. During the evaporation a solid began to separate, and by filtering the final concentrated suspension, 29.4 grams were isolated. The solid was shown to be 4-bromomethyl-2,2-dimethyl-6-ethoxy-1,2 - dihydroquinoline hydrobromide having a melting point of 173–174° C. and the composition C, 45.5; H, 4.8; Br, 42.1; N, 3.5%. ($C_{14}H_{19}Br_2NO$ requires C, 44.6; H, 5.0; Br, 42.4; N, 3.7%.)

*Example VI*

This example describes the preparation of the hydrobromide of a dibromo-derivative of 2,2,4-trimethyl-1,2-dihydroquinoline.

A solution of 20.6 grams (0.096 mol.) of N-acetyl-2,2,4-trimethyl-1,2-dihydroquinoline in 100 cc. of chloroform was stirred at 20–25° C. while a solution of 10.8 cc. (0.19 mol.) of bromine in 100 cc. of chloroform was added during four hours. After standing overnight, the chloroform was removed under reduced pressure at a temperature not exceeding 40° C. The resultant thick syrup slowly crystallized during three weeks. After 23 days, 20 cc. of ethanol and 30 cc. of acetone were added and the mixture was shaken, thereby producing a suspension of crystals. Filtration gave a greenish white solid having a melting point (with decomposition) of 192–193° C. A sample recrystallized from ethanol was obtained as colorless needles having the composition C, 35.3; H, 3.5; Br, 57.1; N, 3.1 ($C_{12}H_{14}Br_3N$ requires C, 35.0; H, 3.4; Br, 57.3; N, 3.4%).

The chemical properties of the compound indicated that it was the hydrobromide of an *x*-bromo-4-bromomethyl-2,2-dimethyl-1,2-dihydroquinoline, *x* being one of positions 5 to 8 in the dihydroquinoline nucleus.

*Example VII*

This example describes the preparation of the hydrobromide of a tribromo-derivative of 2,2,4-trimethyl-1,2-dihydroquinoline and the corresponding free base.

A solution of 20.6 grams (0.096 mol.) of N-acetyl-2,2,4-trimethyl-1,2-dihydroquinoline in 100 cc. of chloroform was stirred at 20–25° C. while a solution of 16.2 cc. (0.285 mol.) of bromine in 200 cc. of chloroform was added during three hours. Next day, the chloroform was removed under reduced pressure at a temperature below 40° C. A mixture of solids separated; some gummy material was removed by washing with ethanol, and the residue was boiled with 220 cc. of acetone. The solid that remained undissolved had a melting point (with decomposition) of 175–177° C. A sample recrystallized from ethanol was obtained as faintly yellow prisms having a melting point (with decomposition) of 180–182° C. and the composition C, 29.9; H, 2.9; Br, 64.4; N, 2.7%. ($C_{12}H_{13}Br_4N$ requires C, 29.3; H, 2.6; Br, 65.2; N, 2.9%.)

The chemical properties of the compound indicated that it was the hydrobromide of an *x,y*-dibromo-4-bromomethyl-2,2-dimethyl-1,2-dihydroquinoline, *x* and *y* being two of positions 3 and 5 to 8 in the dihydroquinoline nucleus.

The free base was obtained by treating a solution of 1 gram of hydrobromide in 4 cc. of ethanol with 1 cc. of a 2 N solution of sodium hydroxide. After crystallization from ethanol the material had a melting point of 98–99° C. and the composition C, 35.0; H, 3.1; N, 3.2%. ($C_{12}H_{12}Br_3N$ requires C, 35.1; H, 2.9; N, 3.4%.)

*Example VIII*

This example describes the preparation of a tetrabromo-derivative of 2,2,4-trimethyl-1,2-dihydroquinoline.

A solution of 20.6 grams (0.096 mol.) of N-acetyl-2,2,4-trimethyl-1,2-dihydroquinoline in 100 cc. of chloroform was stirred at 20–25° C. while a solution of 21.6 cc. (0.38 mol.) of bromine in 200 cc. of chloroform was added during 6 hours. Next day, the solution was concentrated to a volume of 50 cc. by evaporation of the bulk of the solvent under reduced pressure at a temperature not exceeding 40° C. On cooling, 29.7 grams of a yellow solid separated from the solution and were filtered off. A second crop of product, 7.1 grams in weight, was obtained from the filtrate on standing. Recrystallization of the first crop from ethanol gave yellow prisms having a melting point of 160–162° C., and the composition C, 30.1; H, 2.6; Br, 64.7; N, 2.7%. ($C_{12}H_{11}Br_4N$ requires C, 29.4; H, 2.2; Br, 65.5; N, 2.9%.)

The chemical properties of the tetrabromo-derivative indicated that it was a 4-bromomethyl-2,2-dimethyl-*x,y,z*-tribromo-1,2-dihydroquinoline, *x*, *y* and *z* being three of positions 3 and 5 to 8 of the dihydroquinoline nucleus.

*Example IX*

This example describes the preparation of a tetrabromo-derivative of 2,2,4-trimethyl-6 - ethoxy-1,2-dihydroquinoline.

A solution of 16.2 cc. (0.285 mol.) of bromine in 100 cc. of chloroform was added to a stirred solution of 25 grams (0.095 mol.) of N-acetyl-2,2,4-trimethyl-6-ethoxy-1,2-dihydroquinoline in 100 cc. of chloroform during 5 hours at 0–10° C. Next day, the chloroform was evaporated at 30–40° C. under reduced pressure. The residue thus obtained solidified on standing, and after dissolving out some gummy material with acetone, there remained 28.4 grams of a solid having a melting point of 160–161° C. This solid proved to be a mixture containing some amine hydrobromide, but the product obtained by recrystallizing it from ethanol was a free base and had a melting point of 156–157° C. The constitution of this base was uncertain, the elementary analysis being consistent with the introduction of four bromine atoms into the dihydroquinoline molecule and the loss of $C_2H_4$ in addition to the loss of the acetyl group from the nitrogen atom.

*Example X*

This example describes the preparation of a pentabromo-derivative of 2,2,4-trimethyl-1,2-dihydroquinoline.

A solution of 20.6 grams (0.096 mol.) of N-acetyl-2,2,4-trimethyl-1,2-dihydroquinoline in 100 cc. of chloroform was stirred at 20–25° C. while a solution of 32.4 cc. (0.57 mol.) of bromine in 200 cc. of chloroform was added during four hours. After standing overnight, the bulk of the chloroform was evaporated under reduced pressure at a temperature not exceeding 40° C., and during the evaporation 27.1 grams of a crystalline solid separated. This was filtered off and was shown to consist largely of the tetrabromo compound described in Example VIII. By slow evaporation of the filtrate there were obtained 11 grams of a solid which on crystallization from ethanol gave a derivative of 2,2,4-trimethyl-1,2-dihydroquinoline containing five bromine atoms, having a melting point of 182–183° C. and the composition C, 25.9; H, 1.7; Br, 68.3; N, 2.4%. ($C_{12}H_{10}Br_5N$ requires C, 25.4; H, 1.8; Br, 70.4; N, 2.5%.)

On hydrolysis with aqueous sodium hydroxide solution the pentabromo-derivative gave a compound containing a 4-formyl group, thus showing the presence of a 4-dibromomethyl group in the original pentabromo-derivative. The remaining bromine atoms were located in the dihydroquinoline nucleus.

*Example XI*

This example describes the preparation of an octachloro-derivative of 2,2,4-trimethyl-1,2-dihydroquinoline.

A solution of 24 cc. (0.295 mol.) of sulfuryl chloride in 50 cc. of carbon tetrachloride was added during 30 minutes to a stirred solution of 10.7 grams (0.05 mol.) of N-acetyl-2,2,4-trimethyl-1,2-dihydroquinoline in 80 cc. of carbon tetrachloride at 15–25° C. Three days later, 2 cc. of ethanol were added and the mixture was stirred for 1 hour. After standing overnight, the solvent was evaporated under reduced pressure at 30–40° C. The residue thus obtained deposited some solid on standing and this was isolated by filtration following the addition of ethanol to the mixture. The weight of solid was 2.2 grams and its melting point 165–166° C. A sample crystallized from ethanol had a melting point of 168–169° C. and the composition C, 32.0; H, 2.0; Cl, 62.8; N, 3.1%. ($C_{12}H_9Cl_8N$ requires C, 31.9; H, 2.0; Cl. 62.8; N, 3.1%.)

Following the procedures set forth in detail in the preceding examples, other illustrative compounds of this invention are prepared. Such other compounds include:

4-bromopropyl-2,2,-diethyl-1,2-dihydroquinoline;
4-dichloroamyl-2,2-dibutyl-1,2-dihydroquinoline;
4-dibromoethyl-2,2-dipropyl-1,2-dihydroquinoline;
N-propionyl-4-chloromethyl-2,2-diethyl-1,2-dihydroquinoline;
N-toluenesulfonyl-4-bromoethyl-2,2-dimethyl-1,2-dihydroquinoline;
N-valeryl-4-dichloroethyl-2,2-diethyl-1,2-dihydroquinoline;
N-butyryl-4-fluoromethyl-2,2-dimethyl-1,2-dihydroquinoline;
N-acetyl-4-bromoethyl-2,2,6-trimethyl-1,2-dihydroquinoline;
N-ethyl-4-chloromethyl-2,2-diethyl-1,2-dihydroquinoline;
4-bromoethyl-2,2-dimethyl-5,6,7,8-tetrabromo-1,2-dihydroquinoline;
4-chloromethyl-6-dodecyl-2,2-diethyl-1,2-dihydroquinoline;
4-chloroethyl-6,8-dipropoxy-2,2-diethyl-1,2-dihydroquinoline;
4-dibromomethyl-8-octoxy-2,2,6-trimethyl-1,2-dihydroquinoline;
4-chloropropyl-6-butyl-2-ethyl-2-methyl-1,2-dihydroquinoline;
4-bromoethyl-5,6-dibromo-2,2-dimethyl-1,2-dihydroquinoline sulfate;
4-dichloromethyl-6-ethoxy-2,2-dimethyl-1,2-dihydroquinoline oxalate; and
4-bromomethyl-2,2-diethyl-5-methyl-1,2-dihydroquinoline sulfate.

As indicated above, the halogen-containing dihydroquinolines of this invention are useful in the control of bacteria and fungi. With regard to the effectiveness of the dihydroquinolines, it has been found that high activity is particularly displayed by those compounds which contain from two to four halogen atoms exclusive of the halogen atom which may be present as an anion in a hydrohalide salt.

On the basis of optimum effectiveness in inhibiting the growth of the undesirable micro-organisms, the preferred compounds of this invention are those of the formula (II)

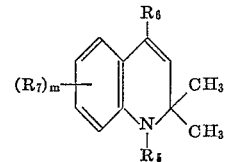

wherein:

$R_5$ is selected from the group consisting of hydrogen, lower alkyl, lower alkyl carbonyl, benzenesulfonyl and toluenesulfonyl;

$R_6$ is selected from the group consisting of chloromethyl, bromomethyl, dichloromethyl and dibromomethyl;

$m$ is an integer from 1 to 4; and $R_7$ is selected from the group consisting of chlorine, bromine, and lower alkyl and lower alkoxy, the sum of the chlorine and bromine atoms in $R_6$ and $R_7$ being from 2 to 4. Said preferred compounds also include the chloride and bromide salts of the compounds in Formula II. Such a compound can be produced by a process in which each of the required halogen atoms is introduced into a starting-material that contains no halogen, or alternatively the starting-material can be for example a 1,2-dihydroquinoline wherein the $R_7$ halogen atoms are already present.

Specific examples of the preferred compounds of the invention are:

N-acetyl-4-chloromethyl-6-chloro-2,2-dimethyl-1,2-dihydroquinoline;
N-toluenesulfonyl-4-bromomethyl-5,6-dibromo-2,2-dimethyl-1,2-dihydroquinoline;
N-ethyl-4-dichloromethyl-6-chloro-2,2-dimethyl-1,2-dihydroquinoline;
4-dibromomethyl-2,2-dimethyl-6-ethoxy-1,2-dihydroquinoline;
4-chloromethyl-5,6-dibromo-2,2-dimethyl-1,2-dihydroquinoline;
4-bromomethyl-2,2-dimethyl-7-bromo-6-ethoxy-1,2-dihydroquinoline;
4-bromomethyl-2,2-dimethyl-5,6-dibromo-1,2-dihydroquinoline;
4-chloromethyl-2,2-dimethyl-3,6,8-trichloro-1,2-dihydroquinoline;
4-dichloromethyl-6,7-dichloro-2,2-dimethyl-1,2-dihydroquinoline hydrochloride; and
4-bromomethyl-2,2-dimethyl-6-bromo-1,2-dihydroquinoline hydrobromide.

The halogen-containing dihydroquinolines of the invention can be employed in any way which makes us of their mycobacteriostatic properties, for instance in the protection of a variety of materials, including cloth, wood, woodpulp, leather and agricultural products, against attack by bacteria or fungi, as well as for the purpose of imparting mycobacteriostatic activity to substantially inert substances, including soaps, waxes and synthetic plastics.

Conventional procedures can be employed for putting into effect the method of preservation that forms part of the invention. The materials to be preserved can for example be sprayed or dipped, using a liquid that comprises the mycobacteriostat, for example one of the mycobacteriostatic compositions of the invention described below that is a liquid; or dusted, using for example one of the mycobacteriostatic compositions of the invention that is a solid.

Mycobacteriostatic compositions of the invention can be suspensions, emulsions, solutions or solids. Liquid compositions are often preferably aqueous ones.

Mycobacteriostatic suspensions can if desired be simple ones of the new compound or its salt in an aqueous medium, stabilized if necessary by the presence of a surface-active agent, for instance a soap or other anionic agent such as, for example, the sodium salt of a long-chain alkylated aromatic sulfonic acid, or a non-ionic agent such as, for instance, an ethylene oxide condensation product. Alternatively, the compound or its salt can be dissolved in a suitable organic solvent and, before use, this solution can then be emulsified in an aqueous medium to give an emulsion of the invention; again this can be stabilized if necessary by a suitable surface-active agent which is conveniently incorporated in the organic solvent. Such an aqueous emulsion is often particularly useful. The organic solvent is preferably immiscible with water, and can, for instance, be a hydrocarbon, such as toluene, cyclohexane or petroleum ether, or some other organic liquid such as chloroform or chlorobenzene. Animal or vegetable oils such as castor oil, sperm oil, cottonseed oil or rape oil, or a mineral oil, are also very suitable. Emulsions can be of the "water-in-oil" type, or can be "oil-in-water." In general the suspensions and emulsions can be mobile or viscous, and can, for example, be in the form of a lotion, paste, cream or ointment. Compositions which are solids can be those in which the inert diluent is a finely-divided powder such as talc, clay, diatomaceous earth and the like.

The proportions of the mycobacteriostat employed in the compositions will vary according to the nature of the compositions and their intended use. In general, it is desirable to incorporate at least 1% by weight, but much larger amounts, for instance 10%, 25% or even 50% can be used, particularly if, as is commonly the case, the composition is a concentrated one intended to be diluted before use.

The invention includes a method for the presevation of a material that is normally subject to deterioration through the action of bacteria or fungi, in which the material is treated with a new halogen-containing dihydroquinoline or one of its salts.

Example XII

This example describes the methods employed in assessing the mycobacteriostatic activity of a compound, and gives the results obtained with several of the halogen-containing dihydroquinolines of the previous examples.

To assess the bacteriostatic activity of a compound, 0.4 cc. of a 1% by volume solution in water (or where the compound was insoluble in water, in acetone), was mixed into 20 cc. of warm sterile nutrient-containing agar in a test tube, giving a concentration of 0.02% of the compound in the medium. The warm agar was immediately poured into a sterile petri dish, and when hard, was inoculated with a culture of the test bacterium (*Staphylococcus aureus*). The dish was kept at a temperature of 37° C. for 24 hours, after which time it was examined for the presence or absence of growth of the organism. In the absence of growth, the test was repeated at a lower concentration of the test compound until a concentration was reached at which growth occurred. The penultimate concentration was recorded as the minimum concentration of the compound capable of inhibiting the growth of the bacteria.

The test employed to assess fungistatic activity was similar except that the incubation period was 72 hours at 25° C. The fungi employed were *Botrytis cinerea, Aspergillus niger* and *Penicillium expansum*.

Minimum inhibitory concentrations are given below:

| Compound | S. aureus | B. cinerea | A. niger | P. expansum |
|---|---|---|---|---|
| | Percent | Percent | Percent | Percent |
| Hydrobromide of dibromo-derivative of 2,2,4-trimethyl-1,2-dihydroquinoline (Example VI) | ---------- | 0.005 | ---------- | ---------- |
| Hydrobromide of tribromo-derivative of 2,2,4-trimethyl-1,2-dihydroquinoline (Example VII) | 0.02 | ---------- | 0.0002 | 0.001 |
| Tetrabromo-derivative of 2,2,4-trimethyl-1,2-dihydroquinoline (Example VIII) | 0.02 | 0.005 | 0.0005 | 0.02 |
| Tetrabromo derivative of 2,2,4-trimethyl-6-ethoxy-1,2-dihydroquinoline (Example IX) | ---------- | ---------- | 0.002 | 0.002 |

While this invention has been described with respect to certain specific embodiments, it is not so limited. It is to be understood that variations and modifications thereof may be made without departing from the spirit and scope of this invention.

The embodiments of the invention in which an exclusive property or privilege is claimed are defined as follows:

1. A member selected from the group consisting of a compound of the formula

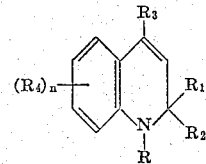

wherein:

R is selected from the group consisting of hydrogen, lower alkyl, lower alkyl carbonyl, benzenesulfonyl and toluenesulfonyl;

$R_1$ and $R_2$ are each lower alkyl;

$R_3$ is lower haloalkyl;

$n$ is an integer from 0 to 4;

$R_4$ is selected from the group consisting of halogen and alkyl and alkoxy of 1 to 12 carbon atoms; and the sulfate, oxalate and halide salts thereof.

2. A member selected from the group consisting of a compound of the formula

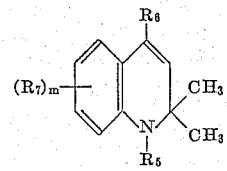

wherein:

$R_5$ is selected from the group consisting of hydrogen, lower alkyl, lower alkyl carbonyl, benzenesulfonyl and toluenesulfonyl;

$R_6$ is selected from the group consisting of chloromethyl, bromomethyl, dichloromethyl and dibromomethyl;

$m$ is an integer from 1 to 4;

$R_7$ is selected from the group consisting of chlorine, bromine, lower alkyl and lower alkoxy, the sum of the chlorine and bromine atoms in $R_6$ and $R_7$ being from 2 to 4; and the chloride and bromide salts thereof.

3. x-bromo-4-bromomethyl-2,2-dimethyl-1,2-dihydroquinoline hydrobromide where $x$ represents one of the 3 and 5–8 positions on the dihydroquinoline nucleus.

4. x,y-dibromo-4-bromomethyl-2,2-dimethyl-1,2-dihydroquinoline hydrobromide where $x$ and $y$ each represent one of the 3 and 5–8 positions on the dihydroquinoline nucleus.

5. 4-bromomethyl-2,2-dimethyl-x,y,z-tribromo-1,2-dihydroquinoline where $x$, $y$ and $z$ each represent one of the 3 and 5–8 positions on the dihydroquinoline nucleus.

6. 4-bromoethyl-2,2-dimethyl-6-ethoxy-x,y,z-tribromo-1,2-dihydroquinoline where $x$, $y$ and $z$ each represent one of the 3, 5, 7 and 8 positions on the dihydroquinoline nucleus.

7. 4-dibromomethyl-2,2-dimethyl-6-ethoxy-x,y-dibromo-1,2-dihydroquinoline where $x$ and $y$ each represent one of the 3, 5, 7 and 8 positions on the dihydroquinoline nucleus.

8. A process which comprises contacting a member selected from the group consisting of a compound of the formula

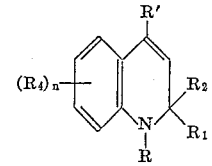

wherein:

R is selected from the group consisting of hydrogen, lower alkyl, lower alkyl carbonyl, benzenesulfonyl and toluenesulfonyl;

$R_1$, $R_2$ and R' are each lower alkyl;

$n$ is an integer from 0 to 4;

$R_4$ is selected from the group consisting of halogen and alkyl and alkoxy of 1 to 12 carbon atoms; and the sulfate, oxalate and halide salts thereof, with a halogenating agent selected from the group consisting of halogen, sulfuryl halide and N-halosuccinimide.

9. A process as defined in claim 8 wherein the temperature is from about 10° to about 40° C.

10. A process as defined in claim 8 wherein said agent is halogen.

References Cited in the file of this patent
UNITED STATES PATENTS

| | | |
|---|---|---|
| 2,758,997 | Steck | Aug. 14, 1956 |
| 2,789,111 | Grewe | Apr. 16, 1957 |
| 2,994,637 | Bimber | Aug. 1, 1961 |
| 3,005,750 | Fluck et al. | Oct. 24, 1961 |
| 3,024,217 | Kibler | Mar. 6, 1962 |